United States Patent Office 3,080,427
Patented Mar. 5, 1963

3,080,427
PREPARATION OF METHYL BORON COMPOUNDS
Thomas Wartik and Robert L. Barnes, State College, Pa., assignors to Koppers Company, Inc., a corporation of Delaware
Filed Sept. 22, 1961, Ser. No. 140,115
6 Claims. (Cl. 260—606.5)

This invention relates to a new method for the preparation of organoboranes. In one specific aspect it relates to a new method for the preparation of methyl boron halides by reacting a boron halide with aluminum carbide in the presence of a hydrogen halide.

Methyl boron halides, such as $CH_3BBr_2$ and $(CH_3)_2BF$, have been used in the synthesis of high energy fuels such as dimethylpentaborane. Trimethylborane is an effective redox catalyst component for vinyl polymerizations. It is also useful as an additive to jet fuels to prevent flame-out of jets at high altitudes.

Heretofore, compounds containing boron-carbon bonds were prepared by methods which are described by Coates in "Organo Metallic Compounds," Second Edition (1960) Chap. 3, pp. 89–94. The three most general methods recommend by Coates are:

(a) Metathesis of an organometallic compound, preferably an aluminum alkyl, with a boron halide, ester or similar derivative illustrated by

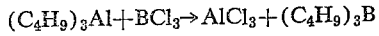

Although this has been, industrially, the most successful method of manufacturing boron alkyls, it suffers serious disadvantages. One disadvantage is the dangerously explosive reaction of aluminum alkyls with even minor amounts of water vapor which may be present in the reactants. A more important economic limitation is that only those aluminum alkyls preparable directly from olefins are inexpensive enough to make this reaction commercial; aluminum alkyls prepared by variations of the classical "sesquichloride" reaction.

are too expensive to give competitive products. Since methylaluminum compounds can only be made from a methylhalide, methylboranes have heretofore been far more expensive to make than the homologous, less reactive and less desirable ethylboranes.

(b) Addition of a boron hydride to an olefin. This reaction:

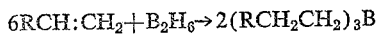

cannot be used to prepare any methylboranes. In addition, all known variations of this reaction involve use of the highly toxic diborane or its in situ formation from highly expensive hydrides such as $NaBH_4$.

(c) Condensation or addition of a hydrocarbon and a boron halide. Preparing organoboranes by direct alkylation is still in the early stages of development and, up to the present time, no one has successfully reacted methane directly with boron halides to produce methylboranes.

Quite surprisingly, we have discovered a new method for the preparation of trimethylborane and methylborane halides of the formula $(CH_3)_nBX_{3-n}$, wherein $n$ is an integer having a value of from 1 to 3. This method involves reacting, under anhydrous oxygen-free conditions, a boron halide or a methyl boron halide with aluminum carbide in the presence of a hydrogen halide.

It is therefore an object of the present invention to provide a new, inexpensive, safer and more flexible method for the preparation of trimethylborane and methyl boron halides.

Other objects and advantages of the invention will become apparent from the following description taken in conjunction with the accompanying drawings in which.

Figure 1:
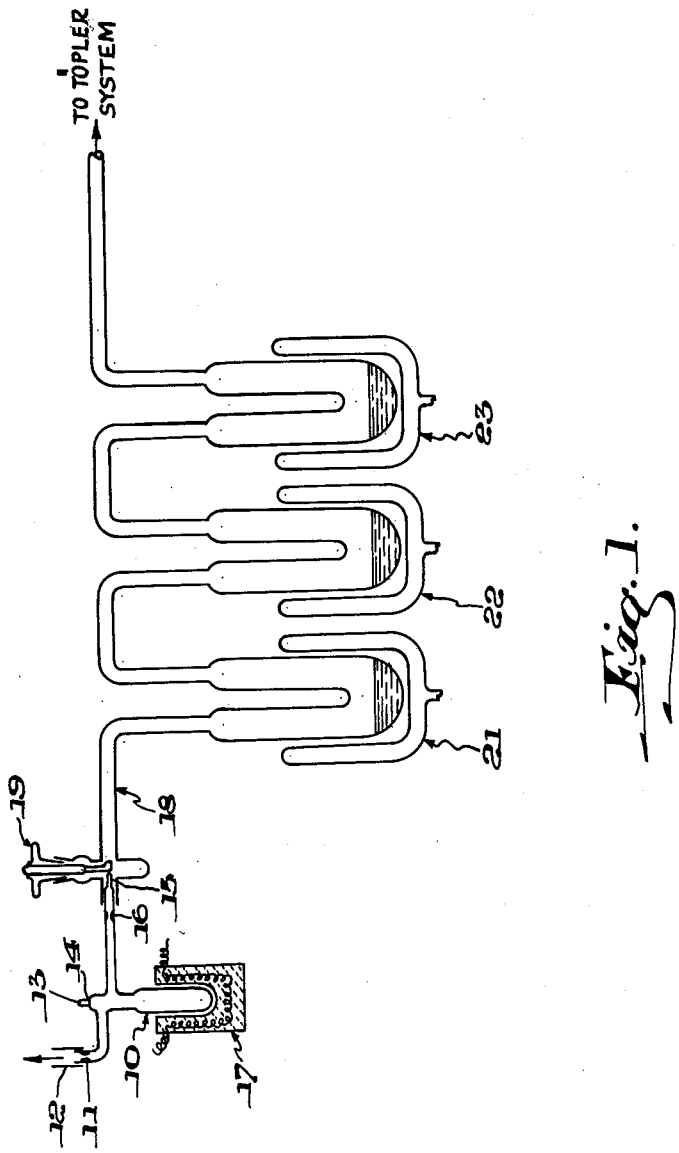
FIGURE 1 is a schematic diagram of a static system for the production of methylboranes.

Unlike the methods used heretofore, our reaction can be run in either a static or a dynamic system; that is, in either a sealed autoclave or a flow reactor under variable temperatures and pressure. The static reaction may be carried out in a small sealed glass ampoule with materials being handled by vacuum line techniques as shown in FIGURE 1. This set up, run in completely inert and controlled atmospheres, permits one to obtain maximum information about the course of the reaction, using only minimum quantities of reactants. Although it is ideally suited for preliminary studies and for investigations of reaction mechanisms, it is not suitable for studying higher reaction pressures. For these purposes, as well as for manufacture on a limited scale, autoclaves are more useful static reactors.

In the static system of FIGURE 1, the reaction is carried on in a small (e.g. 15 cm. in length and 30 mm. in diameter) Pyrex ampoule 10, equipped with a constricted side arm 11 for sealing to a vacuum line 12, an extension 13 with a scratch mark 14 to facilitate addition of the $Al_4C_3$ and a key-breaker type arm 15 which can be broken at point 16. The ampoule 10 is connected to a greaseless section of the vaccum line 12, evacuated and flamed. The ampoule is then filled to one atmosphere pressure with dry nitrogen gas and broken at the scratch mark 14 with a glass rod. Aluminum carbide weighed in a special tube (not shown) is transferred into the ampoule 10 under a stream of dry nitrogen gas. The extension 13 is sealed and the ampoule is evacuated and chilled to −196° C. Required amounts of $BCl_3$ and HCl are distilled into the ampoule by surrounding the latter with a −196° C. bath. The ampoule is then sealed at the side arm 11 from the vacuum line 12, and the lower half placed in an electrical heater 17 for about three hours at a temperature of 350–450° C. The ampoule is then removed, attached to the vacuum line 18 through the key-breaker 19 and frozen to −196° C. for not less than one hour. The ampoule is opened and non-condensibles pumped through a series of traps 21, 22, 23 and measured in a Töpler system (described in Sanderson "Vacuum Manipulation of Volatile Compounds"). Condensible volatile products are distilled from the ampoule 10 into the traps 21, 22, 23 for further analysis. Several milliliters of degased water are then distilled into the ampoule which is sealed at 16 and warmed to room temperature to react unusued $Al_4C_3$ and the product $AlCl_3$. The ampoule is opened to the vacuum line through a key-breaker arm (not shown) and methane is measured. The solution remaining in the ampoule is analyzed for chloride and the solid is analyzed for boron.

For large-scale manufacture or for investigation of pre-equilibria product distribution, flow systems are superior. The flow reactors are exceedingly versatile since they can be operated at variable pressures. The solid reactant, the carbide, may be spread over the bottom of a horizontal reactor tube, on horizontal mesh trays in a vertical tube, or it may be suspended as a fluidized bed in a vertical reactor.

Figure 2:
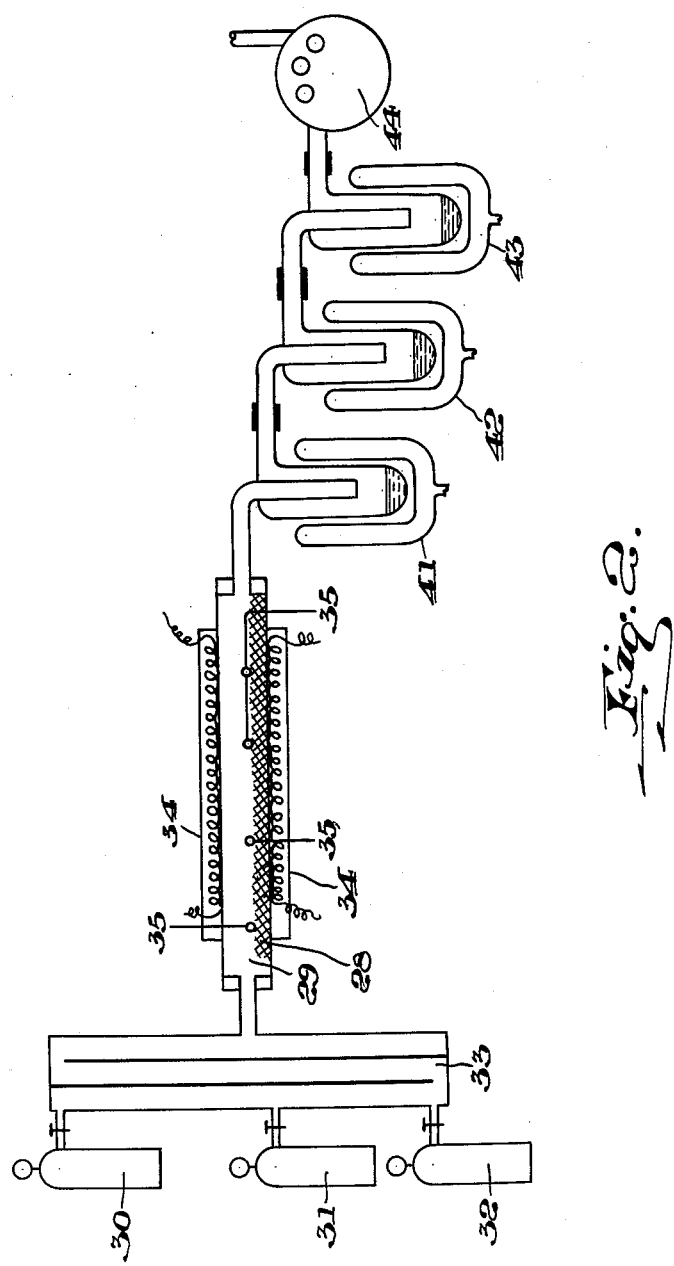
FIGURE 2 is a schematic diagram of a flow system for the continuous production of methylboranes.

A representation of a simple laboratory flow reactor is given in FIGURE 2. In a typical run using this apparatus, weighed carbide 28, with or without an inert diluent such as washed glass beads or vermiculite (not shown), is spread over the bottom of the tube 29, then dried by being heated in a stream of either hydrogen halide from gas cylinder 30 or the "inert atmosphere" (e.g.

helium) from cylinder 31. Depending on the quality and source of the carbide, activation may or may not be necessary. If it is required, the carbide may be activated by heating for approximately one-half hour at 400–500° C. until hydrogen and all tars have been removed. Under these anhydrous, oxygen-free conditions, predetermined and controlled flows of hydrogen halide from cylinder 30 and boron halide from cylinder 32 are mixed in known proportions in mixing chamber 33, then passed over the carbide bed 28 in the reactor tube 29 which is heated by heater 34. Frequent readings of the thermocouples 35 are advisable, in order to follow the course of the reaction.

With this system, it is advisable to use a series of condensate traps at successively colder temperatures, e.g. ice cooled (0–5°) trap 41, Dry Ice solvent cooled (−80° C.) trap 42 and liquid nitrogen cooled (−196° C.) trap 43. Gases not liquified at −196° C. can be measured by being passed through a wet test meter 44 or similar device.

Reactants used in the present invention must be anhydrous and oxygen-free. Any of the hydrogen halides can be used as dry, oxygen-free liquids or gases, but they are not equally desirable. The most convenient and cheapest hydrogen halide is hydrogen chloride. Hydrogen iodide is least desirable because it oxidizes readily and also the product methyliodoboranes are not very stable under the reaction conditions. Hydrogen fluoride cannot be used with glass apparatus or in the presence of silica, but is satisfactory otherwise.

The cheapest of the boron halides is boron trifluoride which can be added directly as a fluid or as one of its solid precursors, e.g. $NaBF_4$, $(CH_3)_3N \cdot BF_3$. It has the advantage of being noncorrosive to glass (unlike HF) and it yields unsublimable $AlF_3$ as a coproduct. Boron tribromide and boron triiodide are useable, although less satisfactory. Both of these, like the chloride yield sublimable aluminum halides as coproducts; depending on the course of the work up, this may or may not be advantageous. The thermal instability of compounds containing boron linked to iodine makes use of $BI_3$ less desirable than that of $BBr_3$.

While the boron halide and the hydrogen halide are not required to contain the same halide radical, different results are produced in the different systems. For greatest economy, boron trifluoride and hydrogen chloride may be used together in the flow system; since there is not enough time to establish equilibria, both methylfluoroboranes and methylchloroboranes are produced. In the static system, where enough time has elapsed to establish equilibrium, the reaction is as follows:

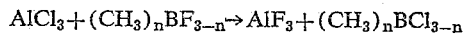

$$AlCl_3 + (CH_3)_nBF_{3-n} \rightarrow AlF_3 + (CH_3)_nBCl_{3-n}$$

Useful carbides are beryllium and aluminum carbide. Aluminum carbide is preferable because it is inexpensive and made from less toxic raw materials. If the aluminum carbide is prepared from aluminum oxide by reduction with pitch tar, a high degree of purity is required to eliminate residues that would interfere with the novel reaction.

It is essential that, during the course of the reaction, an anhydrous oxygen-free atmosphere be maintained. The hydrogen halide, participating in the reaction, may also be used to produce the anhydrous oxygen-free atmosphere. However, it is usually preferable to activate the aluminum carbide by heating in a stream of anhydrous oxygen-free inert gas, such as nitrogen, helium, etc. Hydrogen may be used, but is less desirable than nitrogen because $BCl_3$ is reduced to $HBCl_2$ in the presence of hydrogen at approximately 400° C. If the reaction is operated under high pressure, e.g. 500–10,000 p.s.i., or at a high flow rate with low reactant vapor concentrations, an inert atmosphere should be used.

The stoichiometry of the ideal reaction:

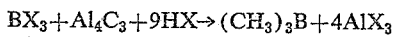

$$BX_3 + Al_4C_3 + 9HX \rightarrow (CH_3)_3B + 4AlX_3$$

is not the most desirable reactant ratio, but depends on the product desired and type of reactor used. As general limits the following ratios are recommended: 1 to 18 moles of hydrogen halide: 0.2 to 2.0 moles of carbide: 1 mole of boron trihalide. An excess of carbide is desirable, especially in the flow system. This is particularly advantageous if $(CH_3)_3B$ is desired, since an excess of hydrogen halide converts $(CH_3)_3B$ stepwise to $BX_3 + 3CH_4$ and excess $BX_3 + B(CH_3)_3$ reacts rapidly to produce $(CH_3)_{3-n}BCl_n$ as well.

In the static system, under favorable conditions, the reaction commences at about 175°, as evidenced by the formation of aluminum chloride sublimate. In the flow system, very little reaction occurs at this temperature unless activated aluminum carbide is used. The recommended temperature range for the reaction is between 150–500° C.

In the static system, an autogeneous pressure, i.e. superatmospheric pressure is most generally used. In the flow system, especially when conducted in the laboratory, it is most convenient to use approximately atmospheric pressure. Reduced pressure helps to strip methylhaloboranes off the carbide bed as rapidly as they are formed, but condensation of the product is made more difficult. Superatmospheric pressure, especially in the absence of an inert atmosphere, accelerates the reaction; but since expensive equipment must be employed, it is justifiable only for large-scale production.

The duration of the reaction varies with the reactant ratio, the temperature, the pressure, the product desired and the equipment used. In the flow system, the reaction is not allowed to go to equilibrium because of the short contact time between the reactants. However, the product can be recycled to change the product distribution.

Our invention is further illustrated by the following examples:

Example I

Using the glass ampoule vacuum line static system described earlier, 1.803 mmoles of boron trichloride and 11.91 mmoles of anhydrous hydrogen chloride were distilled, under anhydrous oxygen-free conditions, into the chilled (−196° C.) glass ampoule, previously charged with 1.259 mmoles of aluminum carbide. The resealed ampoule was placed in an electric heater such that only the bottom half was contained therein and heated quickly to 400° C.; at about 200° C. aluminum chloride started subliming and condensing at the cooler top portion of the glass ampoule. After being heated for 3 hours at 400° C., the ampoule was chilled to about −196° C. for one hour. The ampoule was reattached to the vacuum line, opened, and the vapors not condensable at −196° C., measured in the Töpler system. These proved to be 1.231 mmoles of methane. The vapors condensable at −196° C., 1.60 mmoles, contained no boron trichloride, as shown by the absence of its characteristic infra-red absorption maxima at 10.0 and 10.5 microns. Fractionation of the condensate into traps chilled to various temperatures gave a total of 1.416 mmoles mixed methylchloroboranes having a vapor pressure of 53.8 mm. at −45° C. and showing characteristically strong infra-red absorptions at 7.3, 7.6 and 9.2 microns; the mixture was completely oxidized by fuming nitric acid to carbon dioxide and boric acid.

The devolatilized black residue in the ampoule was then treated with several mls. of degassed, distilled water at −196° C., the ampoule was resealed and allowed to stand at room temperature to complete the hydrolysis of unreacted carbide. There was thus obtained as gas, 0.406 mmole methane; the residue contained 13.9 mmoles chloride (as aluminum chloride) as determined by gravimetric analysis.

The 1.416 mmoles of methylchloroboranes obtained represents a yield of 84.1% on consumed aluminum carbide, 78% on hydrogen chloride consumed and 78.4% on boron trichloride consumed. Although some aluminum carbide and hydrogen chloride remained apparently unreacted, all of the boron trichloride was converted into either volatile or involatile products.

Example II

The procedure of Example I was repeated using 1.711 mmoles of aluminum carbide, 2.770 mmoles boron trichloride and 14.959 mmoles of hydrogen chloride. Since the 2.354 mmoles of condensable product contained boron trichloride but no trimethylborane, as shown by infrared, it was reheated with 1.227 mmoles of aluminum carbide and 13.894 mmoles of hydrogen chloride for 3 hours at 400° C. The condensables, 2.797 mmoles, no longer contained boron trichloride. Tedious refractionation at low temperatures gave a low portion rich in methyldichloroborane, having an experimentally determined molecular weight of 91.9 (as compared to the calculated molecular weight of methyldichloroborane=96.8, dimethylchloroborane=76.4 and trimethylborane=55.9) and a vapor pressure of 125.3 mmoles at −30° C. Hydrolysis of the combined condensate, which represented a near quantitative yield of organic boron compounds based on boron trichloride used, gave trimethylborane, dimethylhydroxyborane and methyldihydroxyborane in a 1:62:37 ratio. This was also the weight ratio of trimethylborane to dimethylchloroborane to methyldichloroborane in the product just prior to hydrolysis. It is important to note that the second reaction with aluminum carbide and hydrogen chloride alone converted a mixture of boron trichloride, methylboron dichloride, and dimethylboron chloride to a larger quantity of methylboron dichloride, dimethylboron chloride and trimethylborane.

Example III

Example I was repeated using 1.562 mmoles of aluminum carbide, 4.612 mmoles of boron trichloride and 13.47 mmoles of hydrogen chloride which were heated for 3 hours at 400° C. The product recovered, in addition to methane, was 3.89 mmoles of methylboron chlorides, giving an 84.4% yield on the boron trichloride charged.

Example IV

In an attempt to isolate volatile reaction intermediates, 2.076 mmoles of boron trichloride and 5.919 mmoles of hydrogen chloride were distilled onto 1.307 mmoles of aluminum carbide as in Example I and the sealed ampoule was heated as rapidly as possible. At about 175° C. a white sublimate, aluminum trichloride, was apparent in the cooler regions of the ampoule. At 210° C. the ampoule was removed and the gases quickly frozen down in the side arm. The condensable volatiles contained, as the only organic boron compounds, methylboron dichloride, in an amount representing less than 10% boron trichloride conversion. No dichloroborane, HBCl₂, could be detected and, therefore, it is probably not a reaction intermediate.

Example V

Two reactions were run to show that hydrogen halide was a necessary reactant. In this, the first, equi-molar quantities of aluminum carbide and boron trichloride were used. After about 3 hours at 400° C. in a sealed ampoule, an 86.5% recovery of boron trichloride was obtained. A trace of methylboron chlorides was formed, attributable to the hydrogen chloride normally in boron trichloride. The unrecovered boron trichloride had presumably been converted to boron carbide.

Example VI

As the second experiment to establish the effect of insufficient hydrogen halide, 1.418 mmoles of aluminum carbide, 2.221 mmoles of boron trichloride and 0.247 mmoles of hydrogen chloride were reacted in a sealed ampoule for one hour at 400° C. The sublimate became apparent at about 200° C.; yellow-green solid was also formed that disappeared on continued heating. Analysis of the products showed that hydrogen chloride was quantitatively converted to methane and the 2.031 mmoles of condensables contained, in addition to the unreacted boron trichloride, very minor quantities of dichloroborane and methylchloroboranes.

Example VII

To establish that hydrogen cannot replace hydrogen halide in the reaction, 1.749 mmoles of aluminum carbide, 2.693 mmoles of boron trichloride and 4.988 mmoles of hydrogen were reacted as before for 4 hours at 300–325° C. Since only a trace of aluminum chloride was formed, the reaction was continued at 400° for 21 hours. At the end of that time more aluminum chloride was formed. The non-condensables, 4.712 mmoles, were a mixture of methane and unreacted hydrogen. The 2.402 mmoles volatile condensables contained 0.419 mmole of dichloroborane, 0.419 mmole hydrogen chloride and traces of methylboronchlorides and unreacted boron trichloride. Repetition of the experiment using 1.285 mmoles of aluminum carbide, 2.773 mmoles of hydrogen and 2.795 mmoles of boron trichloride gave, after 22 hours at 400° C., 2.414 mmoles of condensables having about the same composition.

Example VIII

In a reaction of 1.374 mmoles of aluminum carbide, 4.344 mmoles of boron trichloride and 12.386 mmoles of hydrogen chloride for 3 hours at 400° C., 96.3% of the aluminum carbide was consumed. Although less than 40% was converted to methane, the yield of methylboronchlorides was only 56% of the boron trichloride charged.

Example IX

The set-up of Diagram 2 was used except that no inert gas from cylinder 32 was used and only trap 42 was used. The horizontal Vycor tube, charged with 16.22 grams of 80.5% pure aluminum carbide was heated in air at 400° C. then evacuated at that temperature until no more degasing occurred. The system was then swept for about 1½ hours with a slow stream of dry hydrogen chloride. A 1:3 molar mixture of boron trifluoride and hydrogen chloride was passed over the hot aluminum carbide for 2 hours, which amount to a total of about 3 grams of boron trifluoride. The issuing gases were passed through a single Dry Ice-cooled trap. At the end of the reaction period the cooled residual solids weighed 29.0 grams; the condensate trapped contained approximately 5 mm. of a clear liquid boiling slightly below room temperature; an appreciable quantity of gas was not condensed. Analysis of the bed solids showed it to contain 7.3 grams of aluminum chloride and 6.3 grams unreacted aluminum carbide, but no fluoride. The 5 ml. of condensate was converted, for convenience, to a mixture of pyridine adducts. Since a fluorocarbon mull of this showed strong absorptions, characteristic of $CH_3$ groups, but not $(CH_2)_n$ groups, obviously methylboron halides had been formed. To determine how much, an aliquot of the mixed adducts was added to a refluxing solution of 2 normal potassium hydroxide and 5 normal silver nitrate and the evolved gas was measured and identified. The adduct mixture contained no fluoride; its analysis suggested that the principal organic boron compound was the methylborondichloride adduct of pyridine. From the amount of gas evolved, the yield of methylborondichloride was approximately 10% on the aluminum carbide consumed, or approximately 40% on the boron trifluoride charged. However, since no fluoride was found in the residual solids, none in the condensate, and the reactor and the condensation glassware showed no signs of etching by hydrogen fluoride, a considerable amount of methylboronfluorides must have formed and escaped condensation.

Example X

To prove that methylboronchloride formation requires all three reactants, the following experiments were run:

(a) Heating 1.554 mmoles of aluminum carbide alone 3 hours at 400° C. produced less than 0.005 mmole of methane as the only volatile product. Hydrolysis of the sample in the ampoule produced 4.5 mmoles of methane.

(b) Heating 1.432 mmoles of aluminum carbide and 13.253 mmoles of hydrogen chloride to 400° C. for 3 hours gave 3.225 mmoles of methane as the only non-condensable gas, less than 0.001 unreacted hydrogen chloride. No methane was produced on treating the ampoule solids with water and 13.51 mmoles of chloride by silver nitration was recovered.

(c) 0.774 mmole of boron trichloride and 0.78 mmole of trimethylborane were reacted for 4 hours at 400° C. No methane was produced nor was any hydrogen chloride recovered; also, no solids were produced. Analysis of the product showed that there were 1.513 mmoles of methylboronchlorides and the mixture was shown to contain 30% of boron trichloride, 60% of methylborondichloride, and 10% of dimethylboron chloride.

(d) 0.828 mmole of trimethylborane were heated for 3 hours at 400° C. The product recovered showed 0.81 mmole of trimethylborane only, and no methane or solids were obtained.

*Example XI*

If beryllium carbide is substituted for the aluminum carbide used in Example I, similar results are obtained.

We claim:

1. A method of making methylborane compounds of the formula $(CH_3)_nBX_{3-n}$, wherein X is a halogen and $n$ is an integer having a value of from 1 to 3, comprising reacting, in an anhydrous, oxygen-free atmosphere, in the presence of a hydrogen halide, a metallic carbide selected from the group consisting of aluminum carbide and beryllium carbide with a boron halide of the formula $(CH_3)_{m-1}BX_{4-m}$, wherein X is a halogen and $m$ is an integer having a value of from 1 to 3, the respective values of $n$ and $m$ being such that $n$ is at least equal to $m$ at a temperature of from 150–500° C.

2. A method of making methylborane compounds of the formula $(CH_3)_nBX_{3-n}$, wherein X is a halogen and $n$ is an integer having a value of from 1 to 3, comprising reacting, in an anhydrous, oxygen-free atmosphere, in the presence of a hydrogen halide, a metal carbide selected from the group consisting of aluminum carbide and beryllium carbide with a boron halide of the formula $BX_3$, wherein X is a halogen at a temperature of from 150–500° C.

3. A method according to claim 2 wherein the metal carbide is aluminum carbide.

4. A method according to claim 2 whereby the reaction is carried on continuously by continuously passing said boron halide and said hydrogen halide over a fixed bed of said carbide.

5. A method of making methylborane compounds of the formula $(CH_3)_nBCl_{3-n}$, wherein $n$ is an integer having a value of from 1 to 3, comprising reacting, in an anhydrous, oxygen-free atmosphere, boron trichloride and anhydrous hydrogen chloride with aluminum carbide at a temperature of from 150–500° C., and recovering the methylborane compounds in a chilled condensation trap.

6. A method of making methylborane compounds of the formula $(CH_3)_nBCl_{3-n}$, wherein $n$ is an integer having a value of from 1 to 3, comprising reacting, in an anhydrous, oxygen-free atmosphere, 1 mole of boron trichloride and 1 to 18 moles of anhydrous hydrogen chloride with 0.2 to 20 moles aluminum carbide at a temperature of from 350–450° C. and recovering the methylborane compound from the reaction mixture.

No references cited.